United States Patent [19]
Hammecke

[11] 3,974,993
[45] Aug. 17, 1976

[54] RAILWAY TRACK SWITCH HEATING ARRANGEMENT

[75] Inventor: Michael Hammecke, Darmstadt-Eberstadt, Germany

[73] Assignee: Eltra KG Leicht & Trambauer, Pfungstadt, Germany

[22] Filed: June 9, 1975

[21] Appl. No.: 585,295

[30] Foreign Application Priority Data
June 10, 1974 Germany............................ 2427864

[52] U.S. Cl................................. 246/428; 317/246; 337/300
[51] Int. Cl.² ........................................... E01B 7/24
[58] Field of Search............................ 246/428, 444; 126/271.2; 317/246; 337/300; 104/279

[56] References Cited
UNITED STATES PATENTS
3,312,820   4/1967   Watkins ........................... 246/428
3,882,381   5/1975   Gregory ............................. 317/246

Primary Examiner—Duane A. Reger
Assistant Examiner—Reinhard J. Eisenzopf
Attorney, Agent, or Firm—Michael J. Striker

[57] ABSTRACT

A railway track switch is provided with an arrangement for preventing the accumulation on the track switch of snow such as could cause blockage of a moving part of the track switch or other malfunction. The arrangement includes a controllable track switch heating unit operative when activated for heating at least a part of the track switch, and a capacitive snow-detecting unit arranged in proximity to the track switch. The snow-detecting unit detects accumulated snow or ice, and the operation of the track switch heating unit is automatically controlled in dependence upon such detection.

15 Claims, 6 Drawing Figures

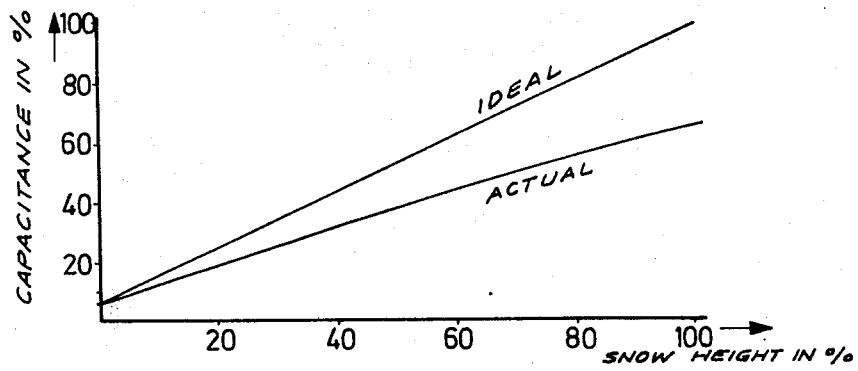
Fig. 3c
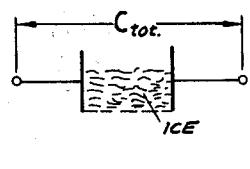
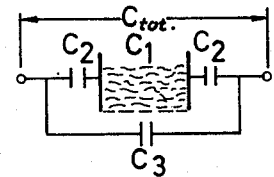
Fig. 3a
Fig. 3b

RAILWAY TRACK SWITCH HEATING ARRANGEMENT

BACKGROUND OF THE INVENTION

The invention relates to track switch heating arrangements, for example of the type wherein electrical heating elements are arranged on the rail sections of the track switch, with temperature or snow sensors controlling the operation of a regulator which in turn regulates the temperature of the one or more heated rail sections of the track switch.

The expression railway track switch as employed herein is to be understood to refer to switching installations for diverting a locomotive, trolley, or the like, from the track on which it is running to another track, such as a side track or branch track. Track switches include moving track rail sections which move between two positions for effecting the desired routing of the railroad train or the like. It is well known that an accumulation of snow, particularly heavy snow or compacted snow, or ice, can block the movement of the moving track rail sections, or cause other track switch malfunctions. It is accordingly commonly desired to prevent such snow accumulations.

It is already known to provide devices which sense rail temperature or accumulated snow and which are operative for controlling the operation of a track switch heating arrangement. However, the known expedients are characterized by a variety of disadvantages.

If the temperature or snow sensors are operative independently of the temperature of the track rail sections of the track switch, or independently of the actual accumulation of snow on the switch, they have the disadvantage that, after effecting initiation of the heating of the track rail section of the track switch, they do not with similar quickness terminate such energy-consuming heating. In the case of temperature sensors, for example, a considerable time may elapse between the rise of the track rail section to an acceptable temperature and a similar temperature rise of the sensor. In the case of snow sensors, the heating may have melted the snow capable of interfering with track switch operation long before the snow in the vicinity of the sensor melts. Furthermore, such sensors may not effect initiation of heating of a track rail section when such heating is required. For example, on a day when the temperature is sub-freezing, a snow-covered train arriving from a locality where a snowfall has occurred may dump a considerable amount of snow or ice upon a track switch in a locality where no snowfall has occurred, due to the forceful vibration of the train as it passes over the track switch, with the result that the track switch becomes covered over or clogged with compacted snow or ice although no snow reaches the snow sensor. There are other reasons why the height of the snow detected by the sensor may not correspond accurately enough to the snow accumulation on the track switch.

Accordingly, it has already been proposed to locate a temperature sensor, such as a semiconductor, a thermoelement, or the like, in contact with a track rail section of the track switch in the region of the moving track rail section of the switch, and to furthermore provide the temperature sensor with its own regulating circuit for the heating current, all in a single housing.

Electronic snow sensors, compared to temperature sensors, have the advantage that they respond faster and more directly to the presence of snow. However, when used in the context in question, known snow sensors do not operate in a completely satisfactory manner. Those which operate upon the basis of a resistance change between two electrodes, and also those which operate upon the basis of a change in the inductance of a sensing coil, undesirably respond not only to snow but also to dirt, dust and the like, and accordingly must be arranged outside the vicinity of the track switch at some height above the level of the ground.

SUMMARY OF THE INVENTION

It is a general object of the invention to provide an improved track switch heating arrangement of the type in question.

It is a feature of the invention to provide a track switch heating arrangement whose regulator employs a snow sensor instead of or in addition to a temperature sensor.

According to a preferred concept of the invention, there is provided, in combination with a railway track switch, an arrangement for preventing the accumulation on the track switch of snow such as could cause blockage of a moving part of the track switch or other malfunction of the track switch, the arrangement including controllable track switch heating means operative when activated for heating at least a part of the track switch, and capacitive snow-detecting means arranged in proximity to the track switch and operative for detecting accumulated snow and automatically controlling the operation of the track switch heating means in dependence upon such detection.

According to a further concept of the invention, the capacitive snow-detecting means includes a snow measuring capacitor comprised of capacitor electrode plates spaced apart to form an open snow accumulator and arranged in the vicinity of the moving rail section of the track switch in heat-exchanging relationship with a rail section of the track switch. The snow measuring capacitor forms the frequency-determining capacitor of an oscillator circuit, and the snow-dependent frequency of the oscillator circuit can be readily enough measured. It has been found that the change in capacitance undergone by such a measuring capacitor in response to the presence of snow and/or ice intermediate the capacitor electrodes differs markedly from the capacitance change resulting from the introduction of dirt, dust, iron and stone dust, sand, and the like. This greatly increases the usefulness of the snow-indicating signal which is generated.

According to an advantageous concept of the invention, the electrodes of the snow sensing capacitor are arranged intermediate the stem rail and the moving track rail section of the track switch, or else up-track of the pointed end of the moving track rail section at the inner side of a track rail. In any event, it is particularly advantageous if the electrodes of the snow sensor are in heat-exchanging relationship—e.g., in heat-exchanging contact—with the heated rail section of the track switch; in effect, this makes for a closed regulating or servo loop. The defrosting or snow removal occurring on the track rail sections, intermediate the track rail sections and the adjoining moving track rail section of the switch track, finds a counterpart in the melting of the snow or ice in between the measuring capacitor electrodes. Although it is considered particularly advantageous that the electrodes themselves be in heat-exchanging relationship with the heated track rail section, other heat conductor means could be provided for transferring heat from the heated rail section to the snow intermediate the electrodes, or for otherwise heating and melting the snow or ice intermediate the electrodes in correspondence to the heating of the rail section.

According to another advantageous concept of the invention, the snow sensing capacitor is the frequency-determining capacitor of an oscillator circuit, the frequency of whose output signal is compared with a fixed frequency, for example by means of a mixing circuit, with filtering being employed to extract the difference-frequency signal which is then rectified and used to control a zero-crossover switch the output signal of which, via an impedance stage, controls the conductivity of an electronic switch element connected in the current path of the heating element.

According to another concept of the invention, the heating of the track switch is initiated only when the snow intermediate the capacitor electrodes has reached a predetermined level—selected in correspondence to a predictable accumulation of snow in the region of the track switch itself—and is terminated only when the snow intermediate the electrodes has lowered to a certain minimum height or completely melted away. This requirement presumes a switching hysteresis which can be achieved in one advantageous circuit arrangement according to the invention by using a threshold switch, e.g., a Schmitt trigger, connected in the measuring circuitry of the snow sensor. Accordingly, the signal available for controlling the regulator will be dependent upon a maximum and a minimum height of the snow intermediate the measuring electrodes.

The novel features which are considered as characteristic for the invention are set forth in particular in the appended claims. The invention itself, however, both as to its construction and its method of operation, together with additional objects and advantages thereof, will be best understood from the following description of specific embodiments when ready in connection with the accompanying drawing.

BRIEF DESCRIPTION OF THE DRAWING

FIG. 3a depicts the circuit diagram of an ideal plate electrode capacitor for different levels of ice and/or snow between the capacitor electrodes;

FIG. 3b depicts the actual effective circuit diagram of a plate electrode capacitor for different levels of ice and/or snow between the capacitor electrodes, showing to what extent the capacitance is not affected by the presence of snow or ice between the electrodes; and FIG. 3c shows the relationship between snow or ice height and normalized capacitance, for both ideal and actual operation.

DESCRIPTION OF THE PREFERRED EMBODIMENTS

Figure 1:
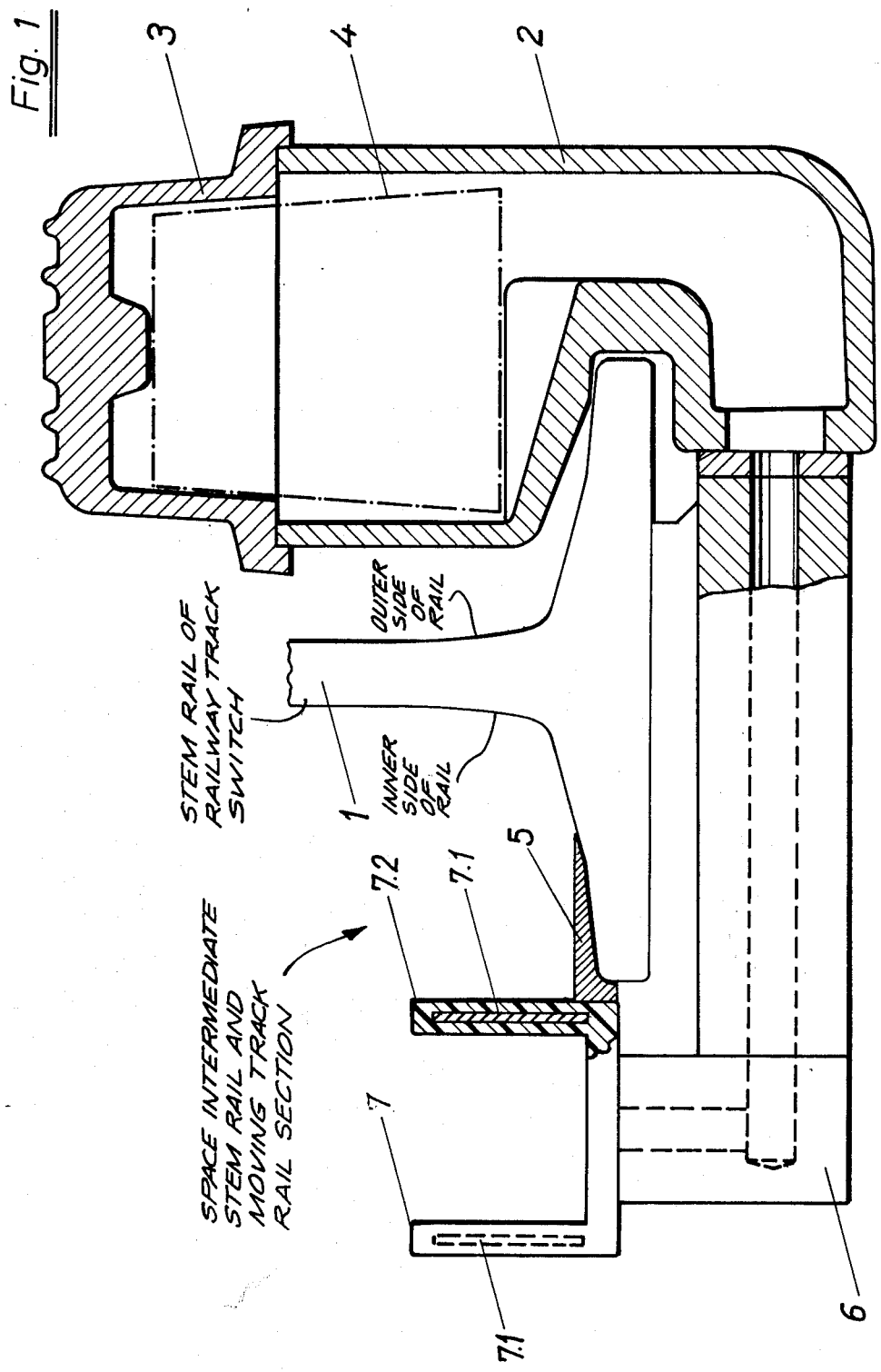
FIG. 1 is a section through the stem rail of a track switch with a heating regulator mounted at the outer side of the rail and snow sensing capacitor electrodes mounted at the inner side of the rail.

In FIG. 1 there is depicted the stem track rail section 1 of a track switch. The (non-illustrated) moving rail section of the track switch is located to the left of the structure shown in FIG. 1. Mounted at the outer side of the stem rail 1 is a connection box 2 having a cover 3 provided with cooling ribs. The connection box 2 accommodates a connecting unit 4 and the circuitry depicted in FIG. 2. There is provided at the inner side of the rail 1, up-track of the movable rail section of the track switch, or else intermediate the rail 1 and the movable rail section of the track switch, a snow sensing capacitor 7 having plate-shaped electrodes 7.1. The electrodes 7.1 are embedded in insulating material 7.2, for example a synthetic plastic. A heat conducting bridge 5 extends between the rail 1 and the right electrode 7.1 and establishes a heat-exchanging relationship between the electrode 7.1 and the rail 1.

The two plates 7.1 of the measuring capacitor 7 together form a snow accumulator. Snow or ice accumulating between the two electrodes 7.1 acts as a dielectric for the capacitor, resulting in a snow-height-dependent change of the capacitance of the capacitor 7.

FIG. 3a depicts the ideal circuit diagram for the capacitor 7, with respect to the effect of snow or ice as a dielectric material intermediate the capacitor electrodes. As can be seen, the snow or ice intermediate the electrodes of the capacitor cooperates with the full associated fraction of the capacitor electrodes.

FIG. 3b depicts the actual effective circuit diagram for the capacitor 7, with respect to the effect of snow or ice as a dielectric material intermediate the capacitor electrodes. As can be seen, the dielectric snow or ice influences only the component $C_1$ of the total capacitance, without influencing the series capacitance component $C_2$ or the shunt capacitance component $C_3$.

FIG. 3c depicts the relationship between the capacitance (normalized with respect to the maximum achievable capacitance), on the one hand, and the height of snow or ice (normalized with respect to the maximum achievable height), on the other hand. It can be seen that, although 100% filling with snow or ice does not result in 100% the maximum capacitance value, the relationship between snow or ice height and capacitance value is well defined and useful.

Experiments were performed using a measuring capacitor 7 whose plates 7.1 were spaced apart 3 cm; the length of the plates 7.1 was 11 cm. Due to the partial capacitance effect attributable to the insulating material 7.2 the capacitor 7 reached only two-thirds the capacitance of a correspondingly dimensioned air capacitor, in this case 0.7 picofarads. Nevertheless, the capacitance of the capacitor 7 changed by a factor of 10, as between the condition wherein the space between the electrodes was empty and that in which the space was full of ice (relative dielectric constant $k = 16$).

Figure 2:
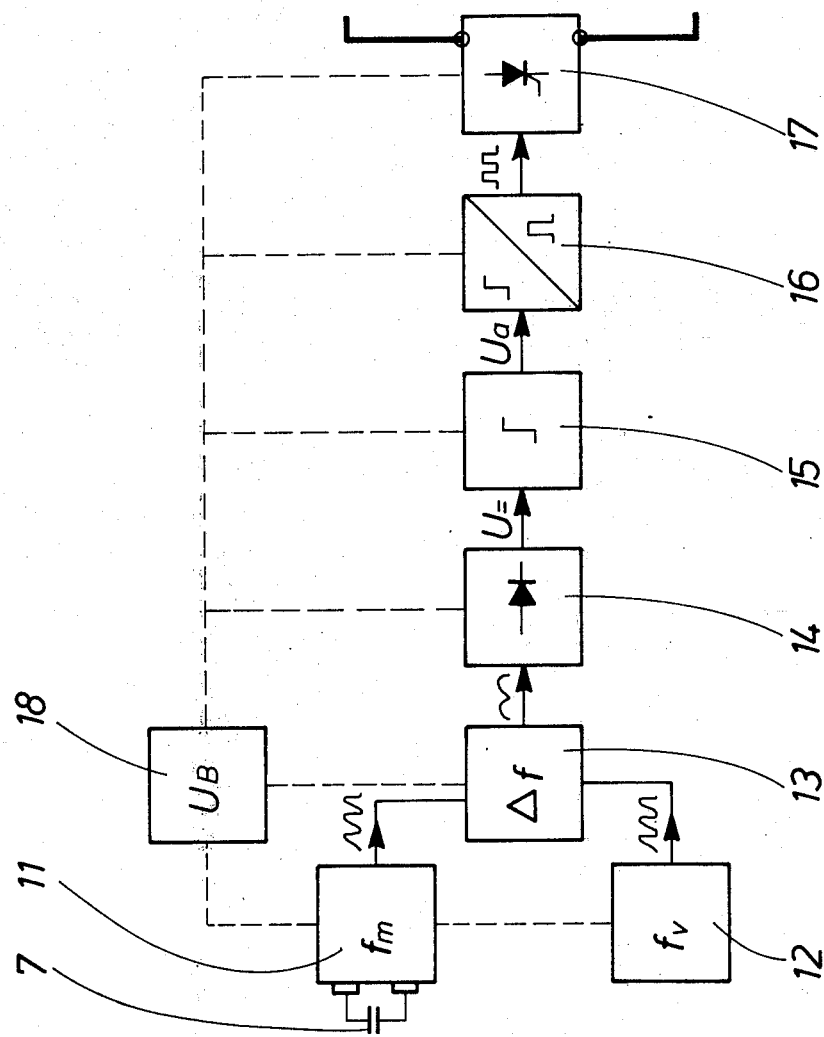
FIG. 2 is a diagram of a circuit for the heating regulator.
Figure 4:
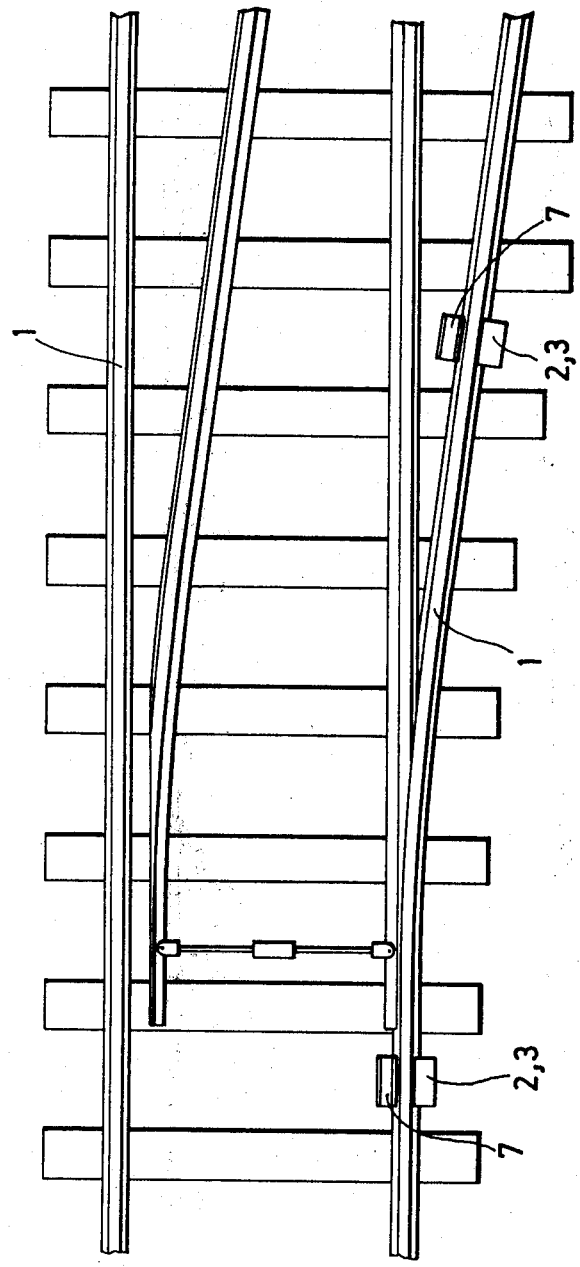
FIG. 4 is a top plan view of a railroad switch track showing preferred locations of the snow detecting means.

The capacitor 7 is employed as the frequency-determining variable capacitor of an oscillating resonant circuit 11 (FIG. 2). The resonant circuit 11 generates an output signal which is periodic and has a frequency $f_m$. This periodic output signal is compared against a periodic reference signal having a fixed reference frequency $f_v$. These first and second signals are applied to a conventional mixing circuit 13 which generates an output signal corresponding to the $\Delta f = f_m - f_v$ term in the product of the two periodic signals.

In the experimental version a base frequency of 30 MHz was selected; with this frequency it was possible to keep the circuit components, particularly inductors, quite small. Additionally, this frequency was such that the requisite degree of frequency constancy could be maintained readily enough despite temperature fluctuations and such that the amplitude of the generated oscillation was relatively constant over the range of capacitance variation—approximately 1 : 3.5 in the experimental version—and all this without the need for circuit components other than relatively inexpensive ones. The frequency $\Delta f$ of the signal at the output of the mixer 13 accordingly varies between 0 and 10 MHz.

The periodic signal of frequency $\Delta f$ is rectified by a rectifier 14, and the rectified voltage $U=$ is applied to the input of a threshold switch 15 (e.g., a Schmitt trigger). When the input signal at the input of the threshold switch 15 is below a certain value, the output voltage $U_a$ of switch 15 has a first value; when the input signal is above a certain value, the output voltage $U_a$ of switch 16 has a second value; one of these values may be the operating voltage $U_B$ supplied by source 18, and the other a lower voltage.

The output voltage $U_a$ is applied to the input of the zero-crossover switch 16 at whose output there appear trigger pulses which are applied to the control input of an electronic switch 17, preferably a triac, for firing the latter in synchronism with the zero-crossover times of the A.C. heating current. In this way, the generation of radio interference is prevented.

A description of further details of the circuit of FIG. 2 are not believed necessary, inasmuch as a variety of conventional circuit components can be selected for performing the functions indicated above. The design could be improved, if desired, for example by filtering out the two frequencies $f_m$ and $f_v$ in the mixing circuit 13 and/or by incorporating into the input circuitry of the rectifier stage 14 a low-pass filter having an adjustable cut-off frequency. It would be advantageous to furthermore employ a safety circuit in the stage 16 operative for blocking stage 16 and generating an alarm signal in response to the development of a short circuit or in response to a discontinuity in the circuit loop containing the measuring capacitor 7.

In general, the circuit of FIG. 2 could be replaced by any frequency-deviation meter, such as one wherein the output signal (difference frequency) of the mixing circuit is applied to a beat frequency amplifier, from there to a limiter and then to a wave shaper and finally to a pulse rate integrator whose output signal is a smooth D.C. signal having a magnitude directly indicative of the height of the snow or ice. This signal could then be applied to the input of a Schmitt trigger whose output is connected to an electronic switch connected in the current path of the electrical heating element for the track switch.

It will be understood that each of the elements described above, or two or more together, may also find a useful application in other types of constructions and circuits differing from the types described above.

While the invention has been illustrated and described as embodied in a snow or ice sensor in which the snow or ice intermediate the electrodes of the frequency-determining capacitor of an oscillator circuit affects the oscillator frequency which is then compared against a reference frequency, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In combination with a railway track switch, an arrangement for preventing the accumulation on the track switch of snow such as could cause blockage of a moving part of the track switch or other malfunction of the track switch, comprising, controllable track switch heating means operative when activated for heating at least one of the track rail sections of said track switch; capacitive snow-detecting means including a capacitor having a pair of electrodes arranged spaced from each other in proximity to said track switch and having a capacitance which is a function of the height of the snow between said electrodes, means for determining and indicating the height of the snow accumulated between said electrodes by detecting the effect of the accumulated snow upon the capacitance of said capacitor and generating a snow-height-indicating electrical signal, means connected to said track switch heating means and connected to receive said snow-height-indicating electrical signal and automatically operative for controlling the operation of said track switch heating means in dependence upon said snow-height-indicating electrical signal, and heat conductor means connected between the heated track rail section and the vicinity of said electrodes for effecting a heating of the snow between said electrodes in correspondence to the heating of said at least one of the track rail sections, whereby as the track rail section is heated and the adjoining snow melts the snow accumulated between said electrodes of said capacitor will likewise melt and the height of snow between said electrodes accordingly decrease.

2. The combination defined in claim 1, wherein said heat conductor means comprises at least one body of thermally conductive material connected between the heated track rail section and one of said electrodes.

3. The combination defined in claim 2, wherein said snow-detecting means further includes at least one insulator body carrying said electrodes, and wherein said at least one body of thermally conductive material is attached to said insulator body in heat-exchanging relationship with at least one of said electrodes and with the base portion of the heated track rail section.

4. The combination defined in claim 1, wherein said track switch heating means is operative for heating at least one of the track rail sections of said track switch, and wherein at least one of said electrodes is in heat-exchanging relationship with the heated track rail section, whereby as the track rail section is heated and the adjoining snow melts the snow accumulated between said electrodes of said capacitor will likewise melt and the height of snow between said electrodes accordingly decrease.

5. The combination defined in claim 4, wherein said electrodes of said capacitor are arranged intermediate the stem track rail section and the moving track rail section of the track switch.

6. The combination defined in claim 4, wherein said electrodes of said capacitor are arranged up-track of the moving track rail section of the track switch at the inner side of a track rail section of the track switch.

7. The combination defined in claim 1, wherein said electrodes are generally plate-shaped and together form at least part of a snow accumulator.

8. The combination defined in claim 1, wherein said electrodes of said capacitor are arranged intermediate the stem track rail section and the moving track rail section of the track switch.

9. The combination defined in claim 1, wherein said electrodes of said capacitor are arranged up-track of the moving track rail section of the track switch at the inner side of a track rail section of the track switch.

10. The combination defined in claim 1, wherein said snow-detecting means includes threshold circuit means operative for determining when the accumulated snow reaches a predetermined height by determining when said electrical signal reaches a corresponding predetermined value.

11. The combination defined in claim 1, wherein said snow-detecting means consists of a plurality of units arranged to form together a single mechanical unit.

12. In combination with a railway track switch, an arrangement for preventing the accumulation on the track switch of snow such as could cause blockage of a moving part of the track switch or other malfunction of the track switch, comprising controllable track switch heating means operative when activated for heating at least a part of said track switch; and capacitive snow-detecting means including a capacitor having a pair of electrodes arranged spaced from each other in proximity to said track switch and having a capacitance which is a function of the height of the snow between said electrodes, means for determining and indicating the height of the snow accumulated between said electrodes by detecting the effect of the accumulated snow upon the capacitance of said capacitor and generating a snow-height-indicating electrical signal, and means connected to said track switch heating means and connected to receive said snow-height-indicating electrical signal and automatically operative for controlling the operation of said track switch heating means in dependence upon said snow-height-indicating electrical signal.

13. In combination with a railway track switch, an arrangement for preventing the accumulation on the track switch of snow such as could cause blockage of a moving part of the track switch or other malfunction of the track switch, comprising, controllable track switch heating means operative when activated for heating at least a part of said track switch; and capacitive snow-detecting means arranged in proximity to said track switch and operative for detecting accumulated snow and automatically controlling the operation of said track switch heating means in dependence upon such detection, wherein said snow-detecting means comprises an oscillating resonant circuit operative for generating a first signal having a snow-height-dependent frequency and including a frequency-determining capacitor comprised of capacitor electrodes arranged spaced from each other in proximity to said track switch and having a capacitance which is a function of the height of the snow between said electrodes, a reference oscillator circuit operative for generating a second signal having a predetermined fixed frequency, and frequency-comparing means operative for generating a snow-height-indicating electrical signal as a function of the difference between the respective frequencies of said first and second signals.

14. In combination with a railway track switch, an arrangement for preventing the accumulation on the track switch of snow such as could cause blockage of a moving part of the track switch or other malfunction of the track switch, comprising, controllable track switch heating means operative when activated for heating at least a part of said track switch; and capacitive snow-detecting means arranged in proximity to said track switch and operative for detecting accumulated snow and automatically controlling the operation of said track switch heating means in dependence upon such detection, wherein said snow-height-measuring means comprises an oscillating resonant circuit operative for generating a signal having a snow-height-dependent frequency and including a frequency-determining capacitor comprised of capacitor electrodes arranged spaced from each other in proximity to said track switch and having a capacitance which is a function of the height of the snow between said electrodes, means for detecting the frequency of said signal and generating an electrical signal having a snow-height-dependent magnitude, and means for controlling the operation of said track switching heating means in dependence upon said snow-height-dependent magnitude.

15. In combination with a railway track switch, an arrangement for preventing the accumulation on the track switch of snow such as could cause blockage of a moving part of the track switch or other malfunction of the track switch, comprising, controllable track switch heating means operative when activated for heating at least one of the track rail sections of said track switch; capacitive snow-detecting means including a capacitor having a pair of electrodes arranged spaced from each other in proximity to said track switch and having a capacitance which is a function of the height of the snow between said electrodes, means for determining and indicating the height of the snow accumulated between said electrodes by detecting the effect of the accumulated snow upon the capacitance of said capacitor and generating a snow-height-indicating electrical signal, means connected to said track switch heating means and connected to receive said snow-height-indicating electrical signal and automatically operative for controlling the operation of said track switch heating means in dependence upon said snow-height-indicating electrical signal, and means for effecting a heating of the snow between said electrodes corresponding to the heating of said at least one of the track rail sections, whereby as the track rait section is heated and the adjoining snow melts the snow accumulated between said electrodes of said capacitor will likewise melt and the height of snow between said electrodes accordingly decrease.

* * * * *